United States Patent
Akiyama et al.

(10) Patent No.: US 6,502,473 B1
(45) Date of Patent: Jan. 7, 2003

(54) RACK BAR AND MANUFACTURING METHOD THEREOF

(75) Inventors: Kazuhiro Akiyama, Toyota (JP); Tomomi Fujii, Toyota (JP); Takashi Yamawaki, Kasugai (JP)

(73) Assignees: Toyota Jidosha Kabushiki Kaisha, Toyota (JP); TRW Automotive Japan Co., Ltd., Kasugai (JP)

( * ) Notice: Subject to any disclaimer, the term of this patent is extended or adjusted under 35 U.S.C. 154(b) by 55 days.

(21) Appl. No.: 09/666,424

(22) Filed: Sep. 21, 2000

(30) Foreign Application Priority Data

Oct. 1, 1999 (JP) .............................. 11-281071

(51) Int. Cl.⁷ .............................. B62D 3/12; B62D 5/22
(52) U.S. Cl. .................... 74/89.17; 74/422; 74/388 PS; 29/893; 148/573; 148/572
(58) Field of Search ................. 74/89.17, 388 PS, 74/422, 498; 29/893; 148/570, 572, 573, 574, 575, 586, 647, 644, 654; 266/125, 259, 260

(56) References Cited

U.S. PATENT DOCUMENTS

| | | |
|---|---|---|
| 4,598,451 A | 7/1986 | Ohki |
| 5,428,208 A * | 6/1995 | Chatterjee et al. .......... 148/573 |
| 5,473,960 A * | 12/1995 | Sakamoto et al. .......... 148/572 |

FOREIGN PATENT DOCUMENTS

| | | | |
|---|---|---|---|
| JP | 54-107812 A | * | 8/1979 |
| JP | 61-139625 A | * | 6/1986 |
| JP | 63-297524 A | * | 12/1988 |
| JP | A-6-200320 | | 7/1994 |
| JP | A-6-264992 | | 9/1994 |
| JP | A-6-344926 | | 12/1994 |
| JP | 7-268481 A | * | 10/1995 |
| JP | 10-158742 A | * | 6/1998 |
| JP | A-11-5138 | | 1/1999 |

* cited by examiner

Primary Examiner—William C Joyce
(74) Attorney, Agent, or Firm—Oliff & Berridge, PLC

(57) ABSTRACT

A rack bar of a power steering unit for a vehicle has improved bending strength. The rack bar includes a rod portion which fits slidably into an oil seal attached to a cylinder portion of a power cylinder, and a rack portion which is formed with the rod portion through a connecting portion and which meshes with a pinion. Quenching is applied the rod portion and to the rack portion, preferably under different conditions. The quenching applied to the rack portion also is applied to at least a portion of the connecting portion.

18 Claims, 1 Drawing Sheet

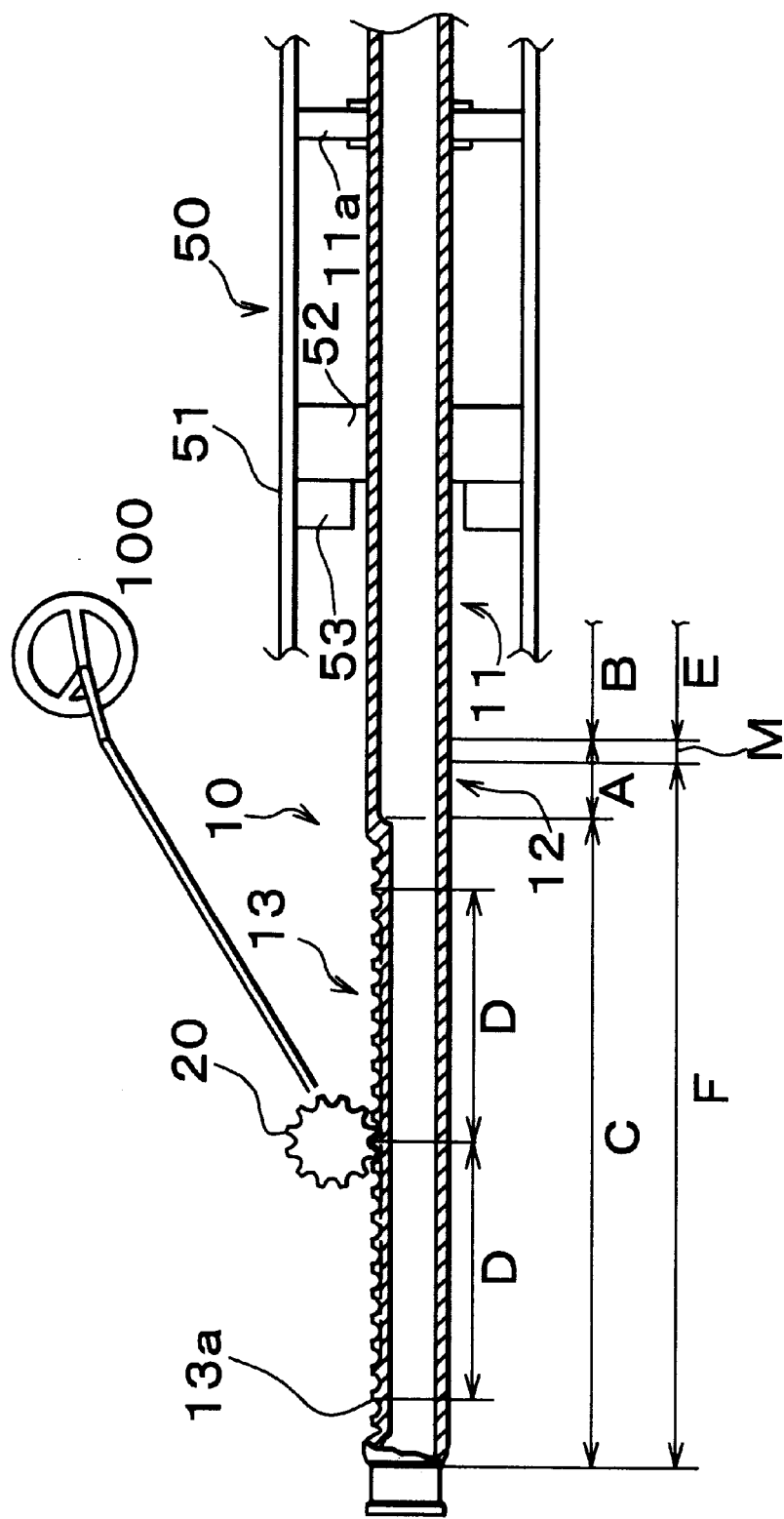

RACK BAR AND MANUFACTURING METHOD THEREOF

INCORPORATION BY REFERENCE

The disclosure of Japanese Patent Application No. 11-281071 filed on Oct. 1, 1999, including the specification, drawings and abstract is incorporated herein by reference in its entirety.

BACKGROUND OF THE INVENTION

1. Field of the Invention

The invention relates to a steering unit for a vehicle, especially to a rack bar, which is a component member of a power steering unit, and the manufacturing method thereof.

2. Description of Related Art

A rack bar having: (1) a rod portion which fits slidably into an oil seal attached to a cylinder portion of a power cylinder, and (2) a rack portion formed with the rod portion through a connecting portion which meshes with a pinion thereof is well known in the art. Also known is a technology for quenching the rack portion for enhancing the strength of the rack portion (see Japanese Laid-Open Patent Application No. 6-200320).

When quenching not only the rack portion but also the rod portion, quenching needs to be performed at different conditions for the rod portion and the rack portion, because they differ in structure, thickness, and the like. In this case, an unquenched boundary region (a quenching boundary region which is not completely quenched resulting in an insufficient enhancement in strength) may be formed between the quenched regions of the rod portion and the rack portion.

When bending force is input to the rack bar through a tire, the bending moment acts on the rack bar. The bending moment is at a maximum at a meshing portion between the rack bar and the pinion at the rack portion, and becomes increasingly smaller farther away from the meshing portion in the axial direction.

Accordingly, bending strength may be of a concern if the above-mentioned unquenched boundary region (the weakest portion of the rack bar) is made the portion which comes close (e.g., the rack side end portion of connecting portion) to the meshing portion between the pinion during the course of displacement of the rack bar in the axial direction (that is, when turning a steering wheel).

SUMMARY OF THE INVENTION

In view of above-mentioned drawbacks, it is an object of the invention to reduce the bending moment which acts on the unquenched boundary region when a bending force is input from outside and to improve the bending strength of the rack bar so as to maintain its durability.

A rack bar for a power steering unit according to one aspect of the invention includes a rod portion that is slidable into an oil seal attached to a cylinder portion of a power cylinder, a connecting portion provided at one end of the rod portion and a rack portion which is connected to the rod portion through the connecting portion and which has racks for meshing with a pinion. The rack bar also includes a first quenched region formed on at least a portion of the rod portion, and a second quenched region formed continuously on at least a portion of the rack portion and the connecting portion.

Therefore, it becomes possible to reduce the bending moment which acts on the unquenched boundary region when a bending force is input from outside and to improve the bending strength of the rack bar so as to maintain its durability.

BRIEF DESCRIPTION OF THE DRAWING

The FIGURE is a partially broken diagram schematically showing portions of power steering unit using a rack bar of the invention.

DETAILED DESCRIPTION OF THE PREFERRED EMBODIMENT(S)

Hereinafter, an embodiment of the invention will be described with reference to the attached drawing.

The FIGURE shows a rack bar 10 of the invention used in a power steering unit for a vehicle. The rack bar 10 is made of a hollow member (e.g., round hollow bar) and a rod portion 11 and a rack portion 13 are formed through a connecting portion 12. In the drawing, the right hand portion of the rod portion 11 is omitted.

The rod portion 11 is formed with a generally round (and hollow) cross section, and a piston 11a is assembled at substantially the central portion of the rod portion 11 in the axial direction. The rod portion 11 is fit with an oil seal 52 attached to a cylinder portion 51 of a power cylinder 50 so as to be slidable in the axial direction. Movement of the oil seal 52 to the left in the drawing is restricted by a holder 53 mounted to the cylinder portion 51. Further, although omitted in the FIGURE, the rod portion 11 is assembled to the cylinder portion 51 at the right side of the drawing, and the rod portion 11 is fit with an oil seal supported by a holder so as to be slidable in the axial direction.

The connecting portion 12 having an axial length A is formed with a generally round cross section, and is continuously formed from the rod portion 11 (on the left side of an oil seal sliding range B shown in the FIGURE).

A rack portion 13 having an axial length C is formed with a plurality of teeth 13a which mesh with a pinion 20 in the longitudinal direction of the axis. The turning of the pinion 20 in response to the turning of a steering wheel 100 causes the rack bar 10 to move in the axial direction.

Axial displacement (rack stroke from neutral position: shown by D in the drawing) of the rack bar 10 is defined by tie rods (not shown) on both ends of the rack bar 10 abutting against stoppers (not shown). When the rack bar 10 moves to an axial displacement end, an end portion of the rod portion 11 (end portion of the oil seal sliding range B) fits with the oil seal 52.

In the present embodiment, the rod portion 11 and the rack portion 13 are quenched for enhancing their strength. Such quenching is performed under different conditions for the rod portion 11 and the rack portion 13, because they differ in structure, thickness, and the like. Also, hardness after quenching is specified separately for the rod portion 11 and the rack portion 13.

For the rod 11, a region (the axial length, range indicated by E in the drawing) substantially corresponding to the oil seal sliding range B is quenched. A quenching region (the axial length, indicated by F in the drawing) for the rack portion 13 is longer than the axial length C of the rack portion 13, and extends to the rod portion 11 side (right hand side in the drawing) to the center of the connecting portion 12. This results in an unquenched boundary region M (the weakest portion of the rack bar) between the quenched region E of the rod portion 11 and the quenched region F of the rack portion 13 that is shorter than the axial length A of the connecting portion 12, and which is offset to the rod portion 11 side (right hand side in the drawing) of the connecting portion 12.

The bending moment acts on the rack bar 10 when a bending force (e.g., a load caused by driving over a curb) is input to the rack bar 10 through a tire (not shown) from outside. This bending moment is at a maximum at a is meshing portion between the rack bar 11 and the pinion 20 at the rack portion 13, and becomes increasingly smaller farther away from the meshing portion in the axial direction.

In the rack bar 10 of the invention, as described above, the unquenched boundary region M is made shorter than the axial length A of the connecting portion 12 so that the boundary region M is offset to the rod portion side (right hand side in the drawing) of the connecting portion 12. Accordingly, the unquenched boundary region M is kept away from the meshing portion of the rack bar 10 with the pinion 20. This allows the bending moment acting on the unquenched boundary region M to be reduced when a bending force is input from outside. Therefore, the bending strength of the rack bar 10 is improved, which in turn enables durability to be maintained. Further, because the rack bar 10 is made with a hollow member, the weight can be reduced and the bending strength further improved.

The invention may also be implemented with a solid rack bar. In this case as well, the bending strength of the rack bar 10 is improved and durability is maintained.

While the present invention has been described with reference to preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the present invention.

What is claimed is:

1. A rack bar for a power steering unit comprising:
   a rod portion having a first end that is slidable into a power cylinder;
   a connecting portion provided at a second end of the rod portion;
   a rack portion connected to the rod portion through the connecting portion and which has teeth for meshing with a pinion;
   a first quenched region formed on at least a portion of the rod portion by a first quenching treatment; and
   a second quenched region formed continuously on at least a portion of the rack portion and on at least a portion of the connecting portion by a second quenching treatment that is different from the first quenching treatment.

2. A rack bar according to claim 1, wherein:
   the rod portion, the connecting portion, and the rack portion have hollow cross sections.

3. A rack bar according to claim 1, wherein:
   the rod portion, the connecting portion, and the rack portion are formed continuously.

4. A rack bar for a power steering unit comprising:
   a rod portion having a first end that is slidable into a power cylinder;
   a connecting portion provided at a second end of the rod portion;
   a rack portion connected to the rod portion through the connecting portion and which has teeth for meshing with a pinion;
   a first quenched region formed on at least a portion of the rod portion; and
   a second quenched region formed continuously on at least a portion of the rack portion and on at least a portion of the connecting portion; wherein
   the hardness of the first quenched region and the hardness of the second quenched region are different.

5. A method for manufacturing a rack bar for a power steering unit, comprising:
   providing a connecting portion at one end of a rod portion;
   connecting a rack portion having teeth for meshing with a pinion to the rod portion through the connecting portion;
   applying a first quenching treatment to at least a portion of the rod portion; and
   applying a second quenching treatment to a continuous region including at least a portion of the rack portion and at least a portion of the connecting portion, the second quenching treatment is different from the first quenching treatment.

6. A manufacturing method according to claim 5, further comprising:
   forming the rod portion, the connecting portion, and the rack portion to have hollow cross sections.

7. A manufacturing method according to claim 5, further comprising:
   continuously forming the rod portion, the connecting portion, and the rack portion.

8. A method for manufacturing a rack bar for a power steering unit, comprising:
   providing a connecting portion at one end of a rod portion;
   connecting a rack portion having teeth for meshing with a pinion to the rod portion through the connecting portion;
   applying a first quenching treatment to at least a portion of the rod portion; and
   applying a second quenching treatment to a continuous region including at least a portion of the rack portion and at least a portion of the connecting portion; wherein
   the first quenching treatment is applied under conditions that are different from conditions applied for the second quenching treatment such that hardnesses of the portions to which the first and second quenching treatments are applied are different.

9. A rack bar for a power steering unit comprising:
   a rod portion having a first end and a second end, the first end is slidable into a power cylinder, and a connecting portion extends from the second end of the rod portion toward the first end;
   a rack portion connected to the second end of the rod portion through the connecting portion, the rack portion has teeth for meshing with a pinion;
   a first quenched region formed on at least a portion of the rod portion;
   a second quenched region formed continuously on at least a portion of the rack portion and on at least a portion of the connecting portion; and
   an unquenched region located on the rod portion between the first quenched region and the second quenched region, the unquenched region is spaced from the second end of the rod portion.

10. A rack bar according to claim 9, wherein a length of the unquenched region is less than a length of the connecting portion.

11. A rack bar according to claim 9, wherein:
the rod portion, the connecting portion, and the rack portion have hollow cross sections.

12. A rack bar according to claim 9, wherein:
the rod portion, the connecting portion, and the rack portion are formed continuously.

13. A rack bar according to claim 9, wherein:
the hardness of the first quenched region and the hardness of the second quenched region are different.

14. A method for manufacturing a rack bar for a power steering unit, comprising:
providing a connecting portion on a rod portion, the connecting portion extending from one end of the rod portion toward an opposite end of the rod portion;
connecting a rack portion having teeth for meshing with a pinion to the rod portion through the connecting portion;
applying a first quenching treatment to at least a portion of the rod portion; and
applying a second quenching treatment to a continuous region including at least a portion of the rack portion and at least a portion of the connecting portion;
the first and second quenching treatments being applied such that an unquenched region is provided on the rod portion between the first quenched region and the second quenched region, the unquenched region is spaced from the one end of the rod portion.

15. A manufacturing method according to claim 14, wherein the first and second quenching treatments are applied such that a length of the unquenched region is less than a length of the connecting portion.

16. A manufacturing method according to claim 14, further comprising:
forming the rod portion, the connecting portion, and the rack portion to have hollow cross sections.

17. A manufacturing method according to claim 14, further comprising:
continuously forming the rod portion, the connecting portion, and the rack portion.

18. A manufacturing method according to claim 14, wherein:
the first quenching treatment is applied under conditions that are different from conditions applied for the second quenching treatment such that hardnesses of the portions to which the first and second quenching treatments are applied are different.

* * * * *